US008634542B2

(12) United States Patent
Spottiswoode et al.

(10) Patent No.: US 8,634,542 B2
(45) Date of Patent: Jan. 21, 2014

(54) SEPARATE PATTERN MATCHING ALGORITHMS AND COMPUTER MODELS BASED ON AVAILABLE CALLER DATA

(75) Inventors: S. James P. Spottiswoode, Beverly Hills, CA (US); Zia Chishti, Washington, DC (US)

(73) Assignee: Satmap International Holdings Limited, Hamilton (BM)

( * ) Notice: Subject to any disclaimer, the term of this patent is extended or adjusted under 35 U.S.C. 154(b) by 795 days.

(21) Appl. No.: 12/331,153

(22) Filed: Dec. 9, 2008

(65) Prior Publication Data
US 2010/0142698 A1 Jun. 10, 2010

(51) Int. Cl.
*H04M 3/523* (2006.01)

(52) U.S. Cl.
USPC ................................. 379/265.13; 379/266.02

(58) Field of Classification Search
USPC ............. 379/265.01, 265.02, 265.11–265.14, 379/266.01, 266.02
See application file for complete search history.

(56) References Cited

U.S. PATENT DOCUMENTS

| | | | |
|---|---|---|---|
| 5,155,763 A | 10/1992 | Bigus et al. |
| 5,206,903 A | 4/1993 | Kohler et al. |
| 5,702,253 A | 12/1997 | Bryce et al. |
| 5,825,869 A | 10/1998 | Brooks et al. |
| 5,926,538 A | 7/1999 | Deryugin et al. |
| 6,052,460 A | 4/2000 | Fisher et al. |
| 6,064,731 A | 5/2000 | Flockhart et al. |
| 6,163,607 A | 12/2000 | Bogart et al. |
| 6,222,919 B1 | 4/2001 | Hollatz et al. |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |

(Continued)

FOREIGN PATENT DOCUMENTS

| | | |
|---|---|---|
| EP | 0 493 292 A2 | 7/1992 |
| EP | 0 949 793 A | 10/1999 |

(Continued)

OTHER PUBLICATIONS

International Report on Patentability mailed on Jun. 14, 2011, for PCT Application No. PCT/US2009/066254, six pages.

(Continued)

*Primary Examiner* — Harry Hong
(74) *Attorney, Agent, or Firm* — Foley & Lardner LLP

(57) ABSTRACT

Apparatus and methods are disclosed for routing callers to agents in a contact center. Exemplary methods and system include using one of a plurality of different computer models for matching callers to agents, the model selected based on a degree and/or type of caller data available. The models may include queue routing, performance based matching, adaptive pattern matching algorithms, or other computer models for matching callers to agents. In one example, similar adaptive models may be used for two or more different degrees/types of caller data, but are trained differently, e.g., based on the degree/type of caller data. Different models for routing callers to agents may perform differently for different degrees/types of caller data. Further, training correlation or adaptive pattern matching algorithms based on different degrees/types of caller data may improve their respective performance compared to a single algorithm for all degrees/types of caller data.

40 Claims, 8 Drawing Sheets

(56) References Cited

U.S. PATENT DOCUMENTS

| | | |
|---|---|---|
| 6,496,580 B1 | 12/2002 | Chack |
| 6,504,920 B1 | 1/2003 | Okon et al. |
| 6,519,335 B1 | 2/2003 | Bushnell |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,092,509 B1 | 8/2006 | Mears et al. |
| 7,103,172 B2 | 9/2006 | Brown et al. |
| 7,209,549 B2 | 4/2007 | Reynolds et al. |
| 7,231,032 B2 | 6/2007 | Nevman et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,229,102 B2 | 7/2012 | Knott et al. |
| 8,295,471 B2 | 10/2012 | Spottiswoode et al. |
| 2002/0018554 A1 | 2/2002 | Jensen et al. |
| 2002/0046030 A1 | 4/2002 | Haritsa et al. |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0138285 A1 | 9/2002 | Decotiis et al. |
| 2002/0143599 A1 | 10/2002 | Nourbakhsh et al. |
| 2002/0161765 A1 | 10/2002 | Kundrot et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0043986 A1 | 2/2005 | McConnell et al. |
| 2005/0129212 A1 | 6/2005 | Parker |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts, Sr. |
| 2006/0184040 A1 | 8/2006 | Keller et al. |
| 2006/0222164 A1 | 10/2006 | Contractor et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121829 A1 | 5/2007 | Tal et al. |
| 2007/0154007 A1 | 7/2007 | Bernhard |
| 2007/0198322 A1 | 8/2007 | Bourne et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0234710 A1 | 9/2009 | Belgaied Hassine et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054452 A1 | 3/2010 | Afzal |
| 2010/0054453 A1 | 3/2010 | Stewart |
| 2010/0111288 A1 | 5/2010 | Afzal et al. |
| 2010/0183138 A1 | 7/2010 | Spottiswoode et al. |
| 2011/0022357 A1* | 1/2011 | Vock et al. .................. 702/182 |
| 2011/0069821 A1 | 3/2011 | Korolev et al. |
| 2011/0125048 A1 | 5/2011 | Causevic et al. |
| 2012/0278136 A1 | 11/2012 | Flockhart et al. |

FOREIGN PATENT DOCUMENTS

| | | |
|---|---|---|
| EP | 1 032 188 A | 8/2000 |
| JP | 2000-078292 | 3/2000 |
| JP | 2000-092213 | 3/2000 |
| JP | 2000-236393 | 8/2000 |
| JP | 2001-292236 | 10/2001 |
| WO | WO-01/63894 | 8/2001 |
| WO | WO-01/63894 A2 | 8/2001 |
| WO | WO-01/63894 A3 | 8/2001 |
| WO | WO-2006/124113 A2 | 11/2006 |
| WO | WO 2010/053701 | 5/2010 |
| WO | WO-2011/081514 | 7/2011 |

OTHER PUBLICATIONS

Anonymous. (2006). "Performance Based Routing in Profit Call Centers," *The Decision Makers' Direct*, located at www.decisioncraft.com, Issue 12/06/1, three pages.

Gans, N. et al. (2003). "Telephone Call Centers: Tutorial, Review and Research Prospects," Manuscript, pp. 1-81.

Koole, G. (2004). "Performance Analysis and Optimization in Customer Contact Centers," *Proceedings of the Quantitative Evaluation of Systems, First International Conference*, Sep. 27-30, 2004, four pages.

Koole, G. et al. (Mar. 6, 2006). "An Overview of Routing and Staffing Algorithms in Multi-Skill Customer Contact Centers," Manuscript, 42 pages.

(56) References Cited

OTHER PUBLICATIONS

Riedmiller, M. et al. (1993). "A Direct Adaptive Method for Faster Backpropagation Learning: The RPROP Algorithm," *1993 IEEE International Conference on Neural Networks*, San Francisco, CA, Mar. 28-Apr. 1, 1993, 1:586-591.
International Search Report mailed on Mar. 13, 2009, for PCT Application No. PCT/US2008/077042, filed on Sep. 19, 2008, 6 pages.
International Search Report mailed on Jun. 3, 2009, for PCT Application No. PCT/US2009/031611, filed on Jan. 21, 2009, 8 pages.
International Search Report mailed on Feb. 24, 2010, for PCT Patent Application No. PCT/US2009/066254, filed on Dec. 1, 2009, 4 pages.
International Search Report mailed on Mar. 12, 2010, for PCT Application PCT/US/2009/054352, filed on Aug. 19, 2009. 8 pages.
Written Opinion mailed on Mar. 13, 2009, for PCT Application No. PCT/US2008/077042, filed on Sep. 19, 2008, 6 pages.
Written Opinion mailed on Jun. 3, 2009, for PCT Application No. PCT/US2009/031611, filed on Jan. 21, 2009, 8 pages.
Written Opinion mailed on Feb. 24, 2010, for PCT Patent Application No. PCT/US2009/066254, filed on Dec. 1, 2009, 6 pages.
Written Opinion mailed on Mar. 12, 2010, for PCT Application PCT/US/2009/054352, filed on Aug. 19, 2009. 6 pages.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 31, 2013 issued in connection with U.S. Appl. No. 12/331,161.
Office Action dated 11//1/2012 issued in connection with Chinese Application No. 20088012833.6, with English Translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 31, 2012 issued in connection with U.S. Appl. No. 12/869,645.
Office Action dated Dec. 31, 2012 issued in connection with U.S. Appl. No. 12/869,654.
Office Action dated Jan. 8, 2013 issued in connection with Australian Patent Application No. 2008349500.
Office Action dated Jan. 8, 2013 issued in connection with Australian Patent Application No. 2009209317.
U.S. Appl. No. 12/266,415, filed Nov. 6, 2008, Afzal et al.
U.S. Appl. No. 12/266,418, filed Nov. 6, 2008, Xie et al.
U.S. Appl. No. 12/266,446, filed Nov. 6, 2008, Chishti.
U.S. Appl. No. 12/266,461, filed Nov. 6, 2008, Chishti.
U.S. Appl. No. 12/355,602, filed Jan. 16, 2009, Xie et al.
U.S. Appl. No. 12/869,645, filed Aug. 26, 2010, Chishti et al.
U.S. Appl. No. 12/869,654, filed Aug. 26, 2010, Chishti et al.
U.S. Appl. No. 13/221,692, filed Aug. 30, 2011, Spottiswoode et al.
Notice of Allowance dated Jun. 29, 2012 issued in connection with U.S. Appl. No. 12/355,618.
Office Action dated Sep. 26, 2011 issued in connection with U.S. Appl. No. 12/355,618.
Office Action dated Feb. 3, 2012 issued in connection with U.S. Appl. No. 12/202,097.
Office Action dated Aug. 19, 2011 issued in connection with U.S. Appl. No. 12/202,097.
Office Action dated Feb. 3, 2012 issued in connection with U.S. Appl. No. 12/202,091.
Office Action dated Sep. 6, 2011 issued in connection with U.S. Appl. No. 12/202,091.
Office Action dated Oct. 7, 2011 issued in connection with U.S. Appl. No. 12/331,210.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated Sep. 15, 2011 issued in connection with U.S. Appl. No. 12/266,418.
Office Action dated Oct. 29, 2012 issued in connection with U.S. Appl. No. 12/490,949.
Office Action dated Mar. 19, 2012 issued in connection with U.S. Appl. No. 12/490,949.
Office Action dated May 11, 2012 issued in connection with U.S. Appl. No. 12/331,195.
Office Action dated Oct. 7, 2011 issued in connection with U.S. Appl. No. 12/331,195.
Office Action dated Jan. 23, 2012 issued in connection with U.S. Appl. No. 12/331,186.
Office Action dated Aug. 19, 2011 issued in connection with U.S. Appl. No. 12/331,186.
Office Action dated Oct. 11, 2012 issued in connection with U.S. Appl. No. 12/267,459.
Office Action dated Mar. 2, 2012 issued in connection with U.S. Appl. No. 12/267,459.
Office Action dated Aug. 4, 2011 issued in connection with U.S. Appl. No. 12/267,459.
Office Action dated Mar. 30, 2012 issued in connection with U.S. Appl. No. 12/267,471.
Office Action dated Jun. 8, 2012 issued in connection with U.S. Appl. No. 12/266,446.
Office Action dated Sep. 12, 2011 issued in connection with U.S. Appl. No. 12/266,446.
Office Action dated Oct. 9, 2012 issued in connection with U.S. Appl. No. 12/202,101.
Office Action dated Mar. 15, 2012 issued in connection with U.S. Appl. No. 12/202,101.
Office Action dated Aug. 9, 2011 issued in connection with U.S. Appl. No. 12/202,101.
Office Action dated Jun. 7, 2012 issued in connection with U.S. Appl. No. 12/331,181.
Office Action dated Sep. 13, 2011 issued in connection with U.S. Appl. No. 12/331,181.
Office Action dated Apr. 6, 2012 issued in connection with U.S. Appl. No. 12/021,251.
Office Action dated Sep. 19, 2011 issued in connection with U.S. Appl. No. 12/021,251.
Notice of Allowance dated Sep. 19, 2012 issued in connection with U.S. Appl. No. 12/180,382.
Office Action dated Mar. 1, 2012 issued in connection with U.S. Appl. No. 12/180,382.
Office Action dated Aug. 23, 2011 issued in connection with U.S. Appl. No. 12/180,382.
Office Action dated Jun. 18, 2012 issued in connection with U.S. Appl. No. 12/331,201.
Office Action dated May 11, 2012 issued in connection with U.S. Appl. No. 12/266,415.
Office Action dated Jan. 19, 2012 issued in connection with U.S. Appl. No. 12/266,415.
Office Action dated Jun. 7, 2012 issued in connection with U.S. Appl. No. 12/355,602.
Office Action dated Sep. 23, 2011 issued in connection with U.S. Appl. No. 12/355,602.
International Search Report mailed Jul. 6, 2010 issued in connection with PCT/US2009/061537.
Written Opinion mailed Jul. 6, 2010 issued in connection with PCT/US2009/061537.
U.S. Appl. No. 13/715,765, filed Dec. 14, 2012, Zia Chishti et al.
U.S. Appl. No. 13/843,541, filed Mar. 15, 2013, Zia Chisti et al.
U.S. Appl. No. 13/843,724, filed Mar. 15, 2013, Spottiswoode et al.
U.S. Appl. No. 13/843,807, filed Mar. 15, 2013, Spottiswoode et al.
U.S. Appl. No. 13/854,825, filed Apr. 1, 2013, Zia Chisti et al.
International Search Report dated Jun. 14, 2013 issued in connection with PCT/US2013/033261.
International Search Report dated May 31, 2013 issued in connection with International Application No. PCT/US 13/33268.
International Search Report mailed Jul. 9, 2013 issued in connection with PCT/US2013/33265.
Notice of Allowance dated Feb. 28, 2013 issued in connection with U.S. Appl. No. 12/331,201.
Notice of Allowance dated Apr. 11, 2013 issued in connection with U.S. Appl. No. 12/869,654.

(56) References Cited

OTHER PUBLICATIONS

Notice of Allowance dated Apr. 10, 2013 issued in connection with U.S. Appl. No. 12/266,461.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Ntzoufras, "Bayesian Modeling Using Winbugs". Wiley Interscience, Oct. 18, 2007.
Office Action dated Jan. 30, 2013 issued in connection with Chinese Application No. 20098011060.8, with English translation.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Feb. 21, 2013 issued in connection with Japanese Patent Application No. 2010-544292.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Aug. 31, 2012 issued in connection with Mexican Patent Application No. MX/a/2011/004815.
Office Action dated Jun. 7, 2013 issued in connection with Japanese Patent Application No. 2010544399.
Office Action dated May 21, 2013 issued in connection with U.S. Appl. No. 12/267,459.
Office Action mailed Apr. 24, 2013 issued in connection with Mexican Patent Application No. MX/a/2011/004815.
Office Action mailed Jul. 2, 2013 in connection with Mexican Application No. MX/a/2010/008238.
Written Opinion dated Jun. 14, 2013 issued in connection with PCT/US2013/033261.
Written Opinion dated May 31, 2013 issued in connection with International Application No. PCT/US 13/33268.
Written Opinion of the International Searching Authority mailed Jul. 9, 2013 issued in connection with PCT/US2013/33265.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Notice of Allowance dated Sep. 5, 2013 issued in connection with U.S. Appl. No. 12/331,161.
Third Office Action dated Aug. 29, 2013 issued in connection with Chinese Application No. 2008801283369.

* cited by examiner

SEPARATE PATTERN MATCHING ALGORITHMS AND COMPUTER MODELS BASED ON AVAILABLE CALLER DATA

CROSS REFERENCE TO RELATED APPLICATIONS

The present application is related to U.S. patent application Ser. No. 12/331,161, titled "SEPARATE MATCHING MODELS BASED ON TYPE OF PHONE ASSOCIATED WITH A CALLER," filed Dec. 9, 2008, and which is incorporated herein by reference in its entirety. This application is further related to U.S. patent application Ser. No. 12/021,251, filed Jan. 28, 2008, which is hereby incorporated by reference in its entirety.

BACKGROUND

1. Field

The present invention relates generally to the field of routing phone calls and other telecommunications in a contact center system.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY

Systems and methods of the present invention can be used to improve or optimize the routing of callers to agents in a contact center. An exemplary method includes determining a degree or type of caller data and selecting one of a plurality of processes or computer models for routing the caller to an agent based on the degree or type of caller data. In another example, the process or model may be selected based on a degree or type of agent data alone or in combination with the degree or type of caller data. It may be found, for example, that different models (or differently trained adaptive models) for routing callers to agents perform differently for different degrees or types of caller data (and/or agent data). Accordingly, exemplary methods described may improve performance of a routing system by using different models based on the degree or type of caller data, agent data, or both.

The plurality of processes or models may include conventional queue routing, performance based matching (e.g., ranking a set of agents based on performance and preferentially matching callers to the agents based on a performance ranking or score), an adaptive pattern matching algorithm or computer model for matching callers to agents (e.g., comparing caller data associated with a caller to agent data associated with a set of agents), affinity data matching, combinations thereof, and so on. The methods may therefore operate to output scores or rankings of the callers, agents, and/or caller-agent pairs for a desired optimization (e.g., for optimizing cost, revenue, customer satisfaction, and so on). In one example, similar adaptive pattern matching algorithms or computer models may be used for two or more different degrees or types of caller data, but are trained (or adapt over time) differently; for example, each trained on past outcomes from those caller-agent pairs that are processed according to the given degree or type of caller data. Training adaptive pattern matching algorithms based on different degrees or types of caller data may improve their respective performance compared to a single algorithm for all degrees or types of caller data.

The degrees of caller data may range from no caller data to a complete set of desired data. For example, in some instances no client data will be known at all, such that a computer model may route a caller to an agent of a set of agents based on agent performance or agent data associated with the agents (if multiple agents are available). Alternatively, the process for routing a caller with no caller data may include conventional queue based routing. In other instances, the degree of caller data may include a portion of a desired or predetermined set of caller data, e.g., including an area code and gender but not others such age, education level, or the like. The partial caller data may be used within a pattern matching algorithm or computer model to determine a routing decision for the caller. The available data may be used by a selected pattern matching algorithm or computer model that is different or differently trained for instances where no data is available. Additionally, separate pattern matching algorithms or computer models may be used and trained for different degrees or types of at least partial caller data. Further, the pattern matching algorithm or computer model may be trained based on past pairings when similar caller data was available.

In one example, the computer model includes a neural network node that is trained on previous known caller data and agent data and the outcome of caller-agent pairs. In one example described herein, at least two different computer models or neural networks are used and trained based on different levels or types of caller data, which may improve performance for the different cases (as compared to using a single computer model or neural network). A method or system may therefore decide which computer model or neural network node to use for routing the caller to an agent based on the available caller data.

Caller data may be determined from a variety of sources including remote or local sources, third-party sources, obtained from callers directly, and so on. It is further noted that the area code may provide, for example, statistical data regarding probable income level, education level, ethnicity, religion, and so on, of a caller which may be used by the pattern matching algorithm or computer model in various fashions. Further, in some instances, the caller data may include Billing Telephone Number (BTN) information. For example, some incoming callers do not have a BTN associated therewith because the number is forwarded from an internal number, has been transferred from another number, and so on. Further, when BTN is known, it may further be determinable if the number is a residential number, cell number, business number, and so on. In some instances, outcome variables may vary based on the type of BTN; for example, the probability of a sale occurring may be greater for a home phone number versus a cell or business number. Accordingly, different models or differently trained adaptive models may be used for different types of BTN information, e.g., no BTN, BTN, BTN-residential, BTN-business, BTN-mobile, and so on.

Another exemplary method includes determining a type or degree of caller data associated with a caller and routing a caller to an agent, queue of callers, or a pool of callers based at least in part on the type or degree of caller data. For instance, for a particular type or degree of caller data, a caller can be routed to a particular queue of callers (e.g., chronologically ordered and routed) or a pool of callers (e.g., not ordered or routed chronologically) for processing and routing to an agent. Accordingly, callers can be segmented or divided into different pools or queues of callers based on the determined type and/or degree of caller data.

According to another aspect, apparatus is provided comprising logic for mapping and routing callers to agents. The apparatus may include logic selecting a model from at least two different models for matching a caller to an agent, where the model is selected based on a degree of caller data associated with the caller. The apparatus further including logic for matching the caller to an agent based on the selected model.

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION

Figure 1:
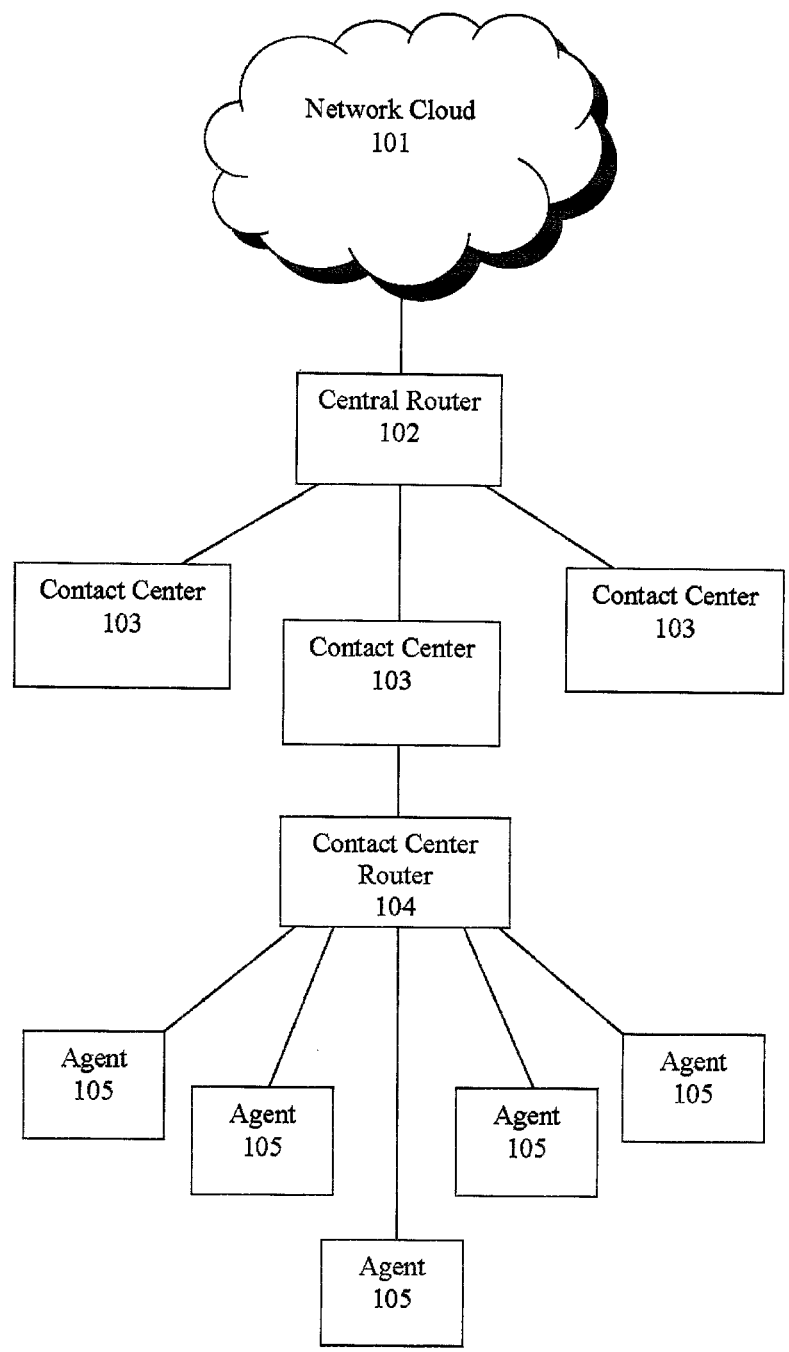
FIG. 1 is a diagram reflecting the general setup of a contact center operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hardwired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to one aspect of the present invention systems, methods, and displayed computer interfaces are provided for routing callers to agents within a call center. In one example, exemplary methods include determining a degree or type of caller data and selecting one of a plurality of processes or models for routing the caller to an agent based on the degree or type of caller data. It may be found that different models for routing callers to agents perform differently for varying degrees or types of caller data. Further, training correlation or adaptive pattern matching algorithms, for example, based on different degrees or types of caller data may improve their respective performance compared to a single algorithm for all degrees or types of caller data. Accordingly, exemplary methods described may improve performance of a routing system by using different models based on the degree or type of caller data.

Initially, exemplary call routing systems and methods utilizing queue based, performance matching, and/or pattern matching algorithms (the latter two of which may be used within generated computer models for predicting the chances of desired outcomes) are described for routing callers to available agents. This description is followed by exemplary systems and methods for determining a level of caller data and selecting one of a plurality of models or methods for matching a caller to an agent. This is additionally followed by exemplary performance based and pattern matching algorithms as well as an exemplary computing system.

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contact addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105. Typically, there are multiple agents 105 at a contact center 103, though there are certainly embodiments where only one agent 105 is at the contact center 103, in which case a contact center router 104 may prove to be unnecessary.

Figure 2:
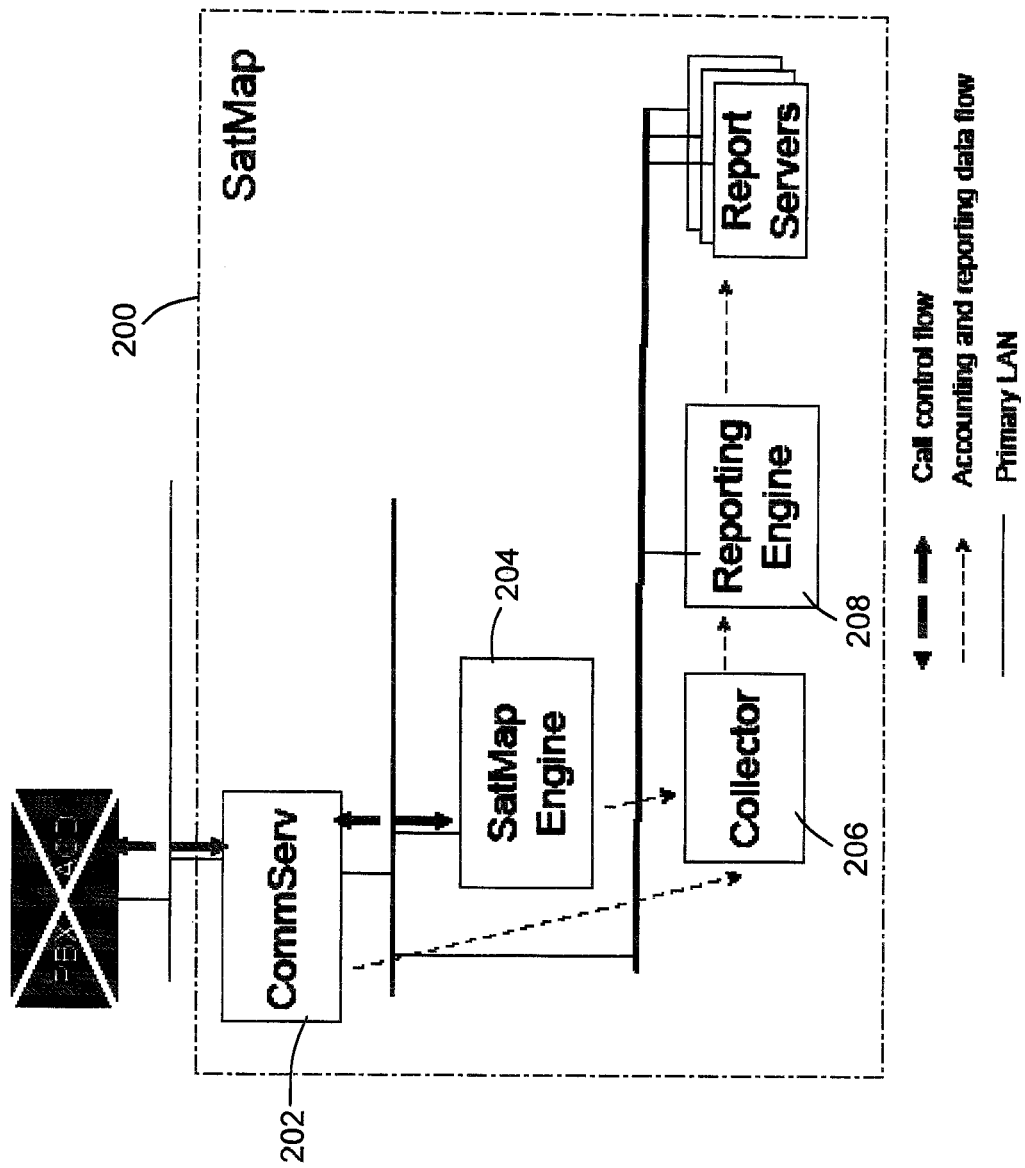
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part and in one example, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and/or computer models, which may adapt over time based on the performance or outcomes of previous caller-agent matches. In one example, the routing engine 204 includes a neural network based adaptive pattern matching engine as is known in the art; for example, a resilient backpropagation (RProp) algorithm, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. Various other exemplary pattern matching and computer model systems and methods which may be included with contact routing system and/or routing engine 204 are described, for example, in U.S. Ser. No. 12/021,251, filed Jan. 28, 2008, and U.S. patent application Ser. No. 12/202,091, filed Aug. 29, 2008, both of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
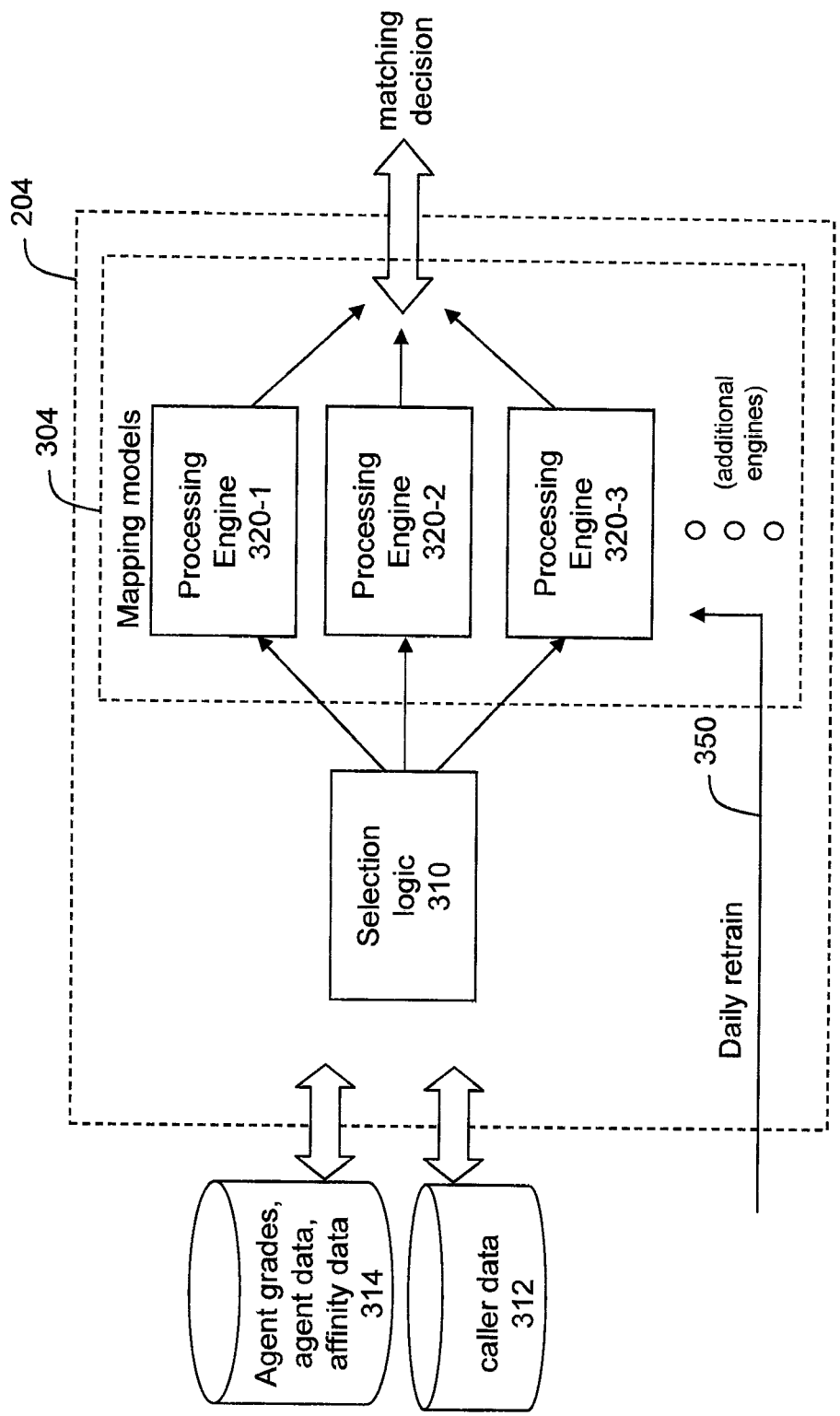
FIG. 3 illustrates an exemplary routing system having a mapping engine for mapping callers to agents based on one of a plurality of matching processes.

FIG. 3 illustrates further detail of exemplary routing engine 204. Routing engine 204 includes a main mapping engine 304 and selection logic 310. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, BTN-data, and other business-relevant data. Additionally, affinity databases (not shown) may be used and such information received by routing engine 204 for making routing decisions.

Mapping engine 304 includes at least two processing engines or computer models as indicated by 320-1, 320-2, and 320-3. The processing engines 320-1, 320-2, and 320-3 may include different or identical computer models or algorithms for mapping callers to agents. For instance, the processing engines may include correlation algorithms such as neural network algorithms, which are trained separately; for instance, each trained based on outcome data for that particular degree or type of caller data. Further, as indicated in FIG. 3 at 350, call history data (including, e.g., caller-agent pair data and outcomes with respect to cost, revenue, customer satisfaction, and so on) may be used to retrain or modify the processing engines 320-1, 320-2, and 320-3. In this manner the processing engines may adapt over time.

In other examples, some or all of the processing engines may include different algorithms. For instance, at a first level of caller data (e.g., no caller data known) the processing engine 320-1 might include a conventional queue based routing method or agent performance based routing method (e.g., as described with respect to FIG. 6). Additionally, some processing engines (e.g., 320-2 and 320-3) might include neural networks, each trained-up on agent-caller pairs that have previously been matched thereto based on the particular degree or type of caller data.

In some examples, routing engine 204 may further include or be in communication with hold queue logic (not shown), which may store or access hold or idle times of callers and agents, and operate to map callers to agents based on queue order of the callers (and/or agents). Accordingly, at a first level of caller data, mapping engine may operate, for example, to map callers based on conventional queue orders and at a second or higher level of caller data utilize a pattern matching algorithm or the like.

Broadly speaking, selection logic 310 operates to select one of the plurality of processing engines 320-1, 320-2, 320-3 for mapping the caller based on the degree or type of caller data. For example, selection logic 310 may include rules for determining whether any caller data is known or available, the degree or type of caller data, and selecting an appropriate processing engine 320-1, 320-2, or 320-3. In one example, selection logic 310 receives caller data, for example, from database 312. Database 312 may include local or remote databases, third party services, and so on (additionally, mapping engine 304 may receive agent data from database 314 if applicable for the particular mapping process). Selection logic 310 may be included in whole or in part with routing engine 204, mapping engine 304, or remotely to both.

Further, it will be understood that selection logic 310 (or another component) may similarly determine or select one of a plurality of processing engines based on a degree or level of agent data similar to that describe for caller data. As such, mapping engine 304 may include a processing engine or computer model for each different degree or type of caller data, each different degree or type of agent data, and/or each different degree or type of combination of degree or type of caller data and agent data.

As will be described in further detail with respect to FIG. 6 below, performance based routing may include ranking or scoring a set of agents based on performance for a particular outcome (such as revenue generation, cost, customer satisfaction, combinations thereof, and the like) and preferentially routing callers to agents based on a performance ranking or score. Accordingly, processing engine 320-1, for example, may receive agent grades or agent history data and output one or more rankings of agents based on one or more desired outcome variables.

Processing engines 320-2 and 320-3, in one example, each include one or more pattern matching algorithms, which may operate to compare caller data with a caller to agent data associated a set of agents and determine a suitability score of each caller-agent pair. Processing engine 320-2 may receive caller data and agent data from various databases (e.g., 312 and 314) and output caller-agent pair scores or a ranking of caller-agent pairs, for example. The pattern matching algorithm may include a correlation algorithm such as a neural network algorithm, genetic algorithm, or other adaptive algorithm(s). Further, in some examples, different processing engines may be used with different pattern matching algorithms operating on the same or different input data, e.g., a first processing engine utilizing a neural network algorithm and a second processing engine utilizing a different algorithm such as a genetic algorithm or other pattern matching algorithm. Additionally, first and second processing engines may include similar pattern matching algorithms operable to maximize different output variables; for example, a first neural network algorithm operable to maximize revenue and a second neural network algorithm operable to maximize customer satisfaction.

Additionally, a processing engine may include one or more affinity matching algorithms, which operate to receive affinity data associated with the callers and/or agents. Affinity data and/or affinity matching algorithms may be used alone or in combination with other processes or models discussed herein.

Additionally, an interface may be presented to a user allowing for adjustment of various aspects of the exemplary systems and methods, for example, allowing adjustments of the number of different models, degrees, and types of caller data. Further, an interface may allow for the adjustment of the particular models used for different degrees or types, for example, adjusting an optimization or weighting of a particular model, changing a model for a particular degree or type of caller data, and so on. The interface may include a slider or selector for adjusting different factors in real-time or at a predetermined time. Additionally, the interface may allow a user to turn certain methods on and off, and may display an estimated effect of changes. For instance, an interface may display the probable change in one or more of cost, revenue generation, or customer satisfaction by changing aspects of the routing system. Various estimation methods and algorithms for estimating outcome variables are described, for example, in copending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the performance based matching, pattern matching algorithm, etc., and applied to current information to estimate current performance (e.g., with respect to one or more of sales, cost, customer satisfaction, etc.). Accordingly, taking historical call data and agent information the system can compute estimates of changing the balance or weighting of the processing methods. It is noted that a comparable time (e.g., time of day, day of the week etc.) for the historical information may be important as performance will likely vary with time.

Figure 4:
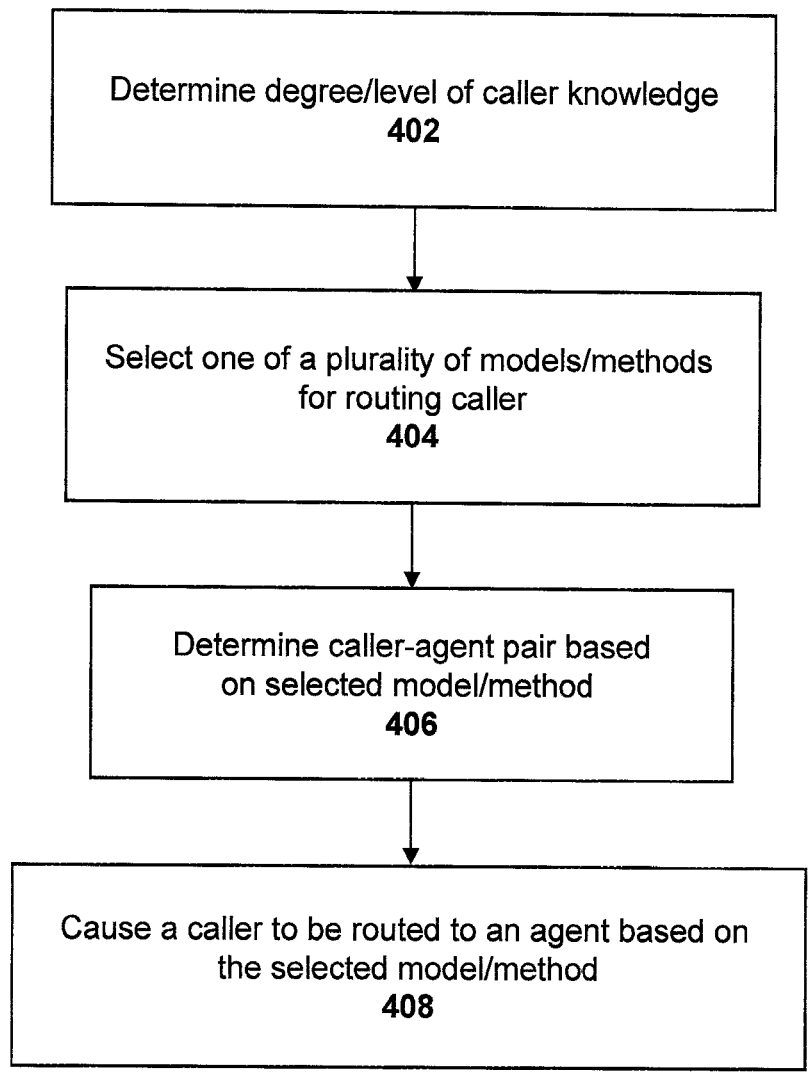
FIG. 4 illustrates an exemplary method for routing callers to agents via one of a plurality of processes or models based on available caller data.

FIG. 4 illustrates an exemplary method for routing callers to agents based on a degree or type of caller data. For instance, the method includes determining a degree or type of caller data at 402. For example, determining a degree of caller data and what types of caller data are available, if any. Caller data may be retrieved or determined from various sources, including local or remote data bases, third-party services, caller input, and so on. In some examples, additional caller data can be estimated before sending to the particular model for matching. For example, incoming caller data might be estimated based on known caller data; for example, estimating income or education level based on a known zip code or area code; estimating geographical region, age, or gender based on a voice analysis technology, and so on.

The method further includes selecting one of a plurality of processes or models at 404 for determining a matching or routing decision to an agent based on the degree and/or type of caller data. A caller and agent may be matched at 406 based on the selected model at 404. Depending on the particular process or model and available data, the data used to match the caller to an agent may further include agent performance grades, caller data and/or agent data, queue order of the callers and agents, combinations thereof, and so on. As discussed above, in some examples, additional estimated data based on known data may be used by the particular model. Further, the selected process or model may output a raw score, normalized score, ranking relative to other callers, agents, and/or caller-agent pairs, and so on.

The selection or mapping of a caller to an agent may then be passed to a routing engine or router for causing the caller to be routed to the agent at 408. The routing engine or router may be local or remote to a system that maps the caller to the agent. It is noted that additional actions may be performed, the described actions do not need to occur in the order in which they are stated, and some acts may be performed in parallel. Further, it will be understood that the exemplary method may alternatively or additionally determine or select one of a plurality of processing engines based on a degree or level of agent data similar to that described for caller data.

Figure 5:
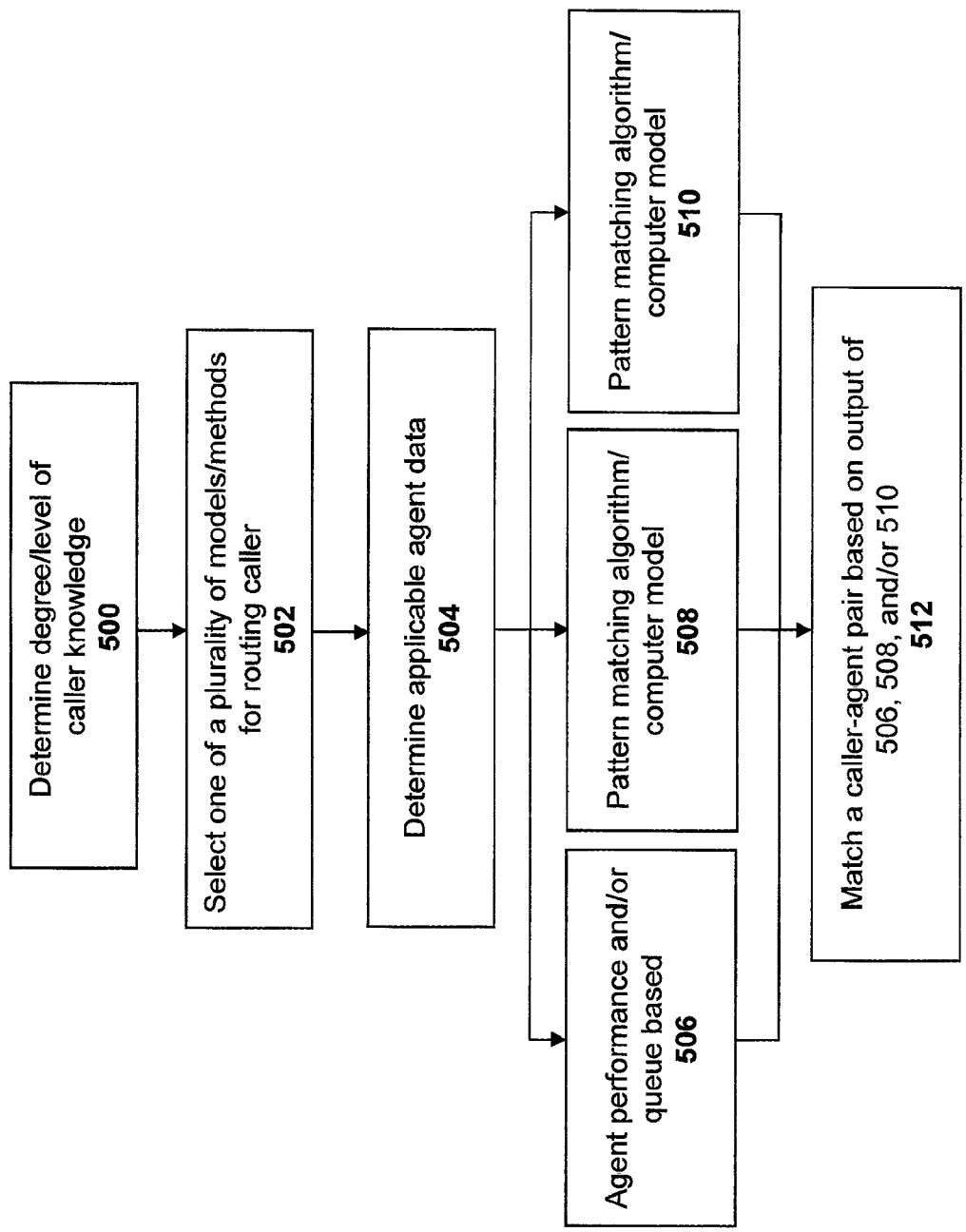
FIG. 5 illustrates another exemplary method for routing callers to agents via one of a plurality of processes or models based on available caller data.

FIG. 5 illustrates another exemplary method for matching callers to agents according to one of at least two different methods, the method selected based on the degree and/or type of caller data. In this example, the degree or type of caller data is determined at 602 and one of a plurality of processes or models for matching the caller to an agent is selected at 604. Additionally, applicable agent data is retrieved at 504, which may vary depending on the selected process or model for matching the caller to the agent. For example, some processes or models, such as agent performance routing, may not need all available agent data.

The applicable caller data and agent data may then be passed to one of the selected matching models 506, 508, or 510. In this particular example, a first model operates to route callers based on agent performance at 506. For instance, a set of agents are scored or ranked based on performance and a caller is routed to the highest scored or ranked agent. The first model may be selected when no (or very little) caller data is available, for example. Such a model for ranking agents based on performance and matching callers thereto is described in greater detail with respect to FIG. 6 below.

The method further includes matching caller-agent pairs at 508 according to a second model for mapping callers to agents, in particular, according to an adaptive pattern matching algorithm. The pattern matching algorithm may include comparing caller data and agent data for each caller-agent pair and computing a suitability score or ranking of caller-agent pairs for a desired outcome variable (or weighting of outcome variables). The second model may be used when a portion, but not all, of a desired or predetermined set of caller data is determinable. Additionally, for a particular degree of caller data, many different models may be used for different types of caller data. For example, a different model or trained model can be used for having only age data versus having only gender data. An exemplary pattern matching algorithm is described in greater detail with respect to FIG. 7 below, and may include a correlation algorithm such as a neural network algorithm.

The method further includes matching caller-agent pairs at 510 according to a third model for mapping callers to agents. The third model may be used when a complete (or nearly complete) set of desired or predetermined caller data is determined (of course, any number of models may be used for many different degrees or types of caller data). In this example, the third model includes a second pattern matching algorithm; however, the pattern matching algorithm is different or trained differently than the model of 508. For instance, in one example, identical correlation or neural network algorithms are used at 508 and 510, however, they are trained or have adapted to different sets of data. For instance, the correlation or neural network algorithm at 508 trained on outcomes from caller-agent pairs matched thereby (in this example for callers having the second degree or level of caller data). Similarly, the correlation or neural network algorithm at 510 trained on outcomes from caller-agent pairs matched thereby (in this example having the third degree or level of caller data).

The final selection or mapping of a caller to an agent may then be passed to a routing engine or router for causing the caller to be routed to the agent. It is again noted that the described actions do not need to occur in the order in which they are stated and some acts may be performed in parallel (for example, determining caller data at 502 and determining agent data at 504 may be performed partially or wholly in parallel). Further, additional (or fewer) matching methods for mapping callers to agents may be used. Caller data and/or agent data may further include affinity data, which may be used by one or more of the plurality of matching methods. The use of affinity data and affinity databases alone or in combination with pattern matching algorithms is described in greater detail below. Further, it will be understood that the exemplary method may alternatively or additionally determine or select one of a plurality of processing engines based on a degree or level of agent data similar to that described for caller data.

Figure 6:
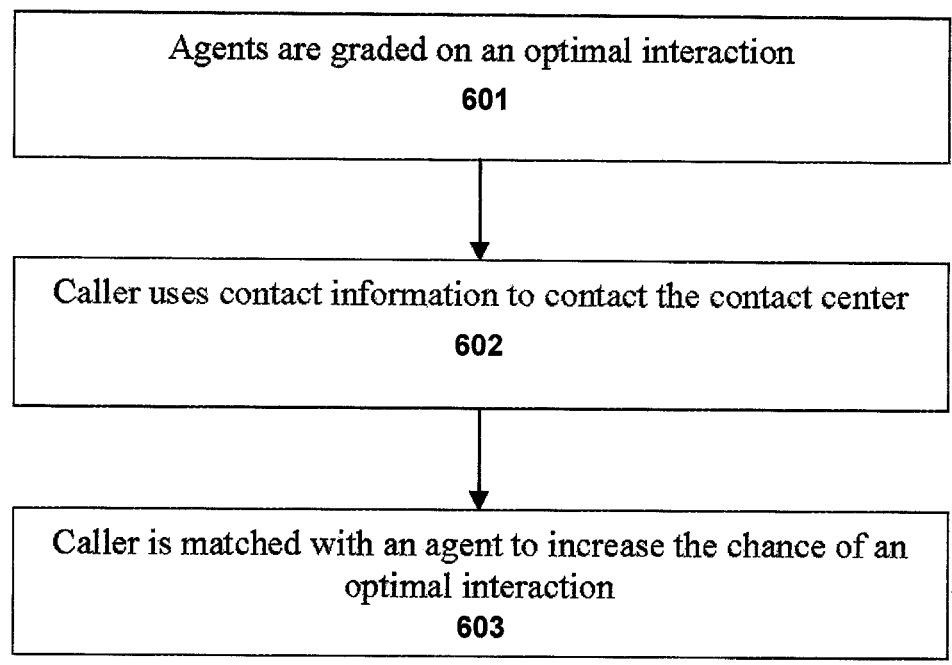
FIG. 6 illustrates an exemplary method or computer model for matching callers to agents based on performance.

FIG. 6 illustrates a flowchart of an exemplary method or model for matching callers to agents based on performance. The method includes grading two or more agents on an optimal interaction and matching a caller with at least one of the two or more graded agents to increase the chance of the optimal interaction. At the initial block 601, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agent can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The foregoing, however, are only examples of how agents may be graded; many other methods may be used.

Figure 7:
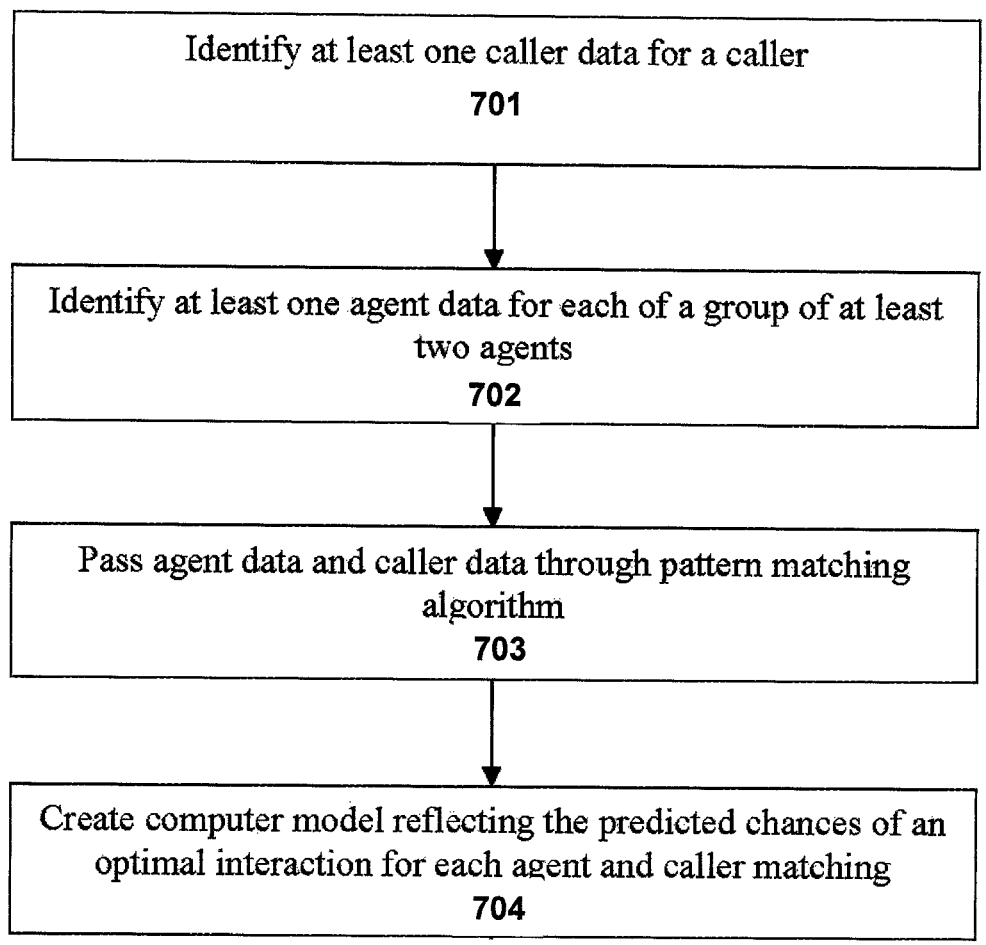
FIG. 7 illustrates an exemplary method or computer model for matching callers to agents based on caller data and agent data.

At block 602 a caller uses contact information, such as a telephone number or email address, to initiate a contact with the contact center. At block 603, the caller is matched with an agent or group of agents such that the chance of an optimal interaction is increased, as opposed to just using the round robin matching methods of the prior art. The method may further include grading a group of at least two agents on two optimal interactions, weighting one optimal interaction against another optional interaction, and matching the caller with one of the two graded agents to increase the chance of a more heavily-weighted optimal interaction. In particular, agents may be graded on two or more optimal interactions, such as increasing revenue, decreasing costs, or increasing customer satisfaction, which may then be weighted against each other. The weighting can be as simple as assigning to each optimal interaction a percentage weight factor, with all such factors totaling to 100 percent. Any comparative weighting method can be used, however. The weightings placed on the various optimal interactions can take place in real-time in a manner controlled by the contact center, its clients, or in line with pre-determined rules. Optionally, the contact center or its clients may control the weighting over the internet or some another data transfer system. As an example, a client of the contact center could access the weightings currently in use over an internet browser and modify these remotely. Such a modification may be set to take immediate effect and, immediately after such a modification, subsequent caller routings occur in line with the newly establishing weightings. An instance of such an example may arise in a case where a contact center client decides that the most important strategic priority in their business at present is the maximization of revenues. In such a case, the client would remotely set the weightings to favor the selection of agents that would generate the greatest probability of a sale in a given contact. Subsequently the client may take the view that maximization of customer satisfaction is more important for their business. In this event, they can remotely set the weightings such that callers are routed to agents most likely to maximize their level of satisfaction. Alternatively the change in weighting may be set to take effect at a subsequent time, for instance, commencing the following morning FIG. 7 illustrates another exemplary model or method for matching a caller to an agent, and which may combine agent grades, agent demographic data, agent psychographic data, and other business-relevant data about the agent (individually or collectively referred to in this application as "agent data"), along with demographic, psychographic, BTN data, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences.

This exemplary model or method includes determining at least one caller data for a caller, determining at least one agent data for each of two agents, using the agent data and the caller data in a pattern matching algorithm, and matching the caller to one of the two agents to increase the chance of an optimal interaction. At 801, at least one caller data (such as a caller demographic or psychographic data) is determined. One way of accomplishing this is by retrieving this from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 702, at least one agent data for each of two agents is determined. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this advanced embodiment preferably uses agent grades, demographic, psychographic, and other business-relevant data, along with caller demographic, psychographic, and other business-relevant data, other examples can eliminate one or more types or categories of caller or agent data to minimize the computing power or storage needs.

Once agent data and caller data have been collected, this data is passed to a computational system. The computational system then, in turn, uses this data in a pattern matching algorithm at 703 to create a computer model that matches each agent with the caller and estimates the probable outcome of each matching along a number of optimal interactions, such as the generation of a sale, the duration of contact, or the likelihood of generating an interaction that a customer finds satisfying.

Exemplary pattern matching algorithms can include any correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

At 704, the pattern matching algorithm is used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, exemplary methods and systems can match every available agent with every available caller, or even a narrower subset of agents or callers. Likewise, the exemplary methods and systems can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used to determine which agents should be connected to which callers.

In other examples, exemplary models or methods may utilize affinity data associated with callers and/or agents. For example, affinity data may relate to an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue, irrespective of what the matches generated using caller data and agent demographic or psychographic data may indicate.

In one example, affinity data and an affinity database developed by the described examples may be one in which a caller's contact outcomes are tracked across the various agent data. Such an analysis might indicate, for example, that the caller is most likely to be satisfied with a contact if they are matched to an agent of similar gender, race, age, or even with a specific agent. Using this example, the method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply. As an example, if an exemplary method was to rely solely on commercial databases in order to match a caller and agent, it may predict that the caller would be best matched to an agent of the same gender to achieve optimal customer satisfaction. However, by including affinity database information developed from prior interactions with the caller, an exemplary method might more accurately predict that the caller would be best matched to an agent of the opposite gender to achieve optimal customer satisfaction.

Another aspect of the present invention is that it may develop affinity databases that comprise revenue generation, cost, and customer satisfaction performance data of individual agents as matched with specific caller demographic, psychographic, or other business-relevant characteristics (referred to in this application as "agent affinity data"). An affinity database such as this may, for example, result in predicting that a specific agent performs best in interactions with callers of a similar age, and less well in interactions with a caller of a significantly older or younger age. Similarly this type of affinity database may result in predicting that an agent with certain agent affinity data handles callers originating from a particular geography much better than the agent handles callers from other geographies. As another example, an exemplary method may predict that a particular agent performs well in circumstances in which that agent is connected to an irate caller.

Though affinity databases are preferably used in combination with agent data and caller data that pass through a pattern matching algorithm to generate matches, information stored in affinity databases can also be used independently of agent data and caller data such that the affinity information is the only information used to generate matches. For instance, in some examples, the first level of processing may include a first computer model that relies on both a pattern matching algorithm and affinity data, and a second computer model that relies on affinity data alone.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 8:
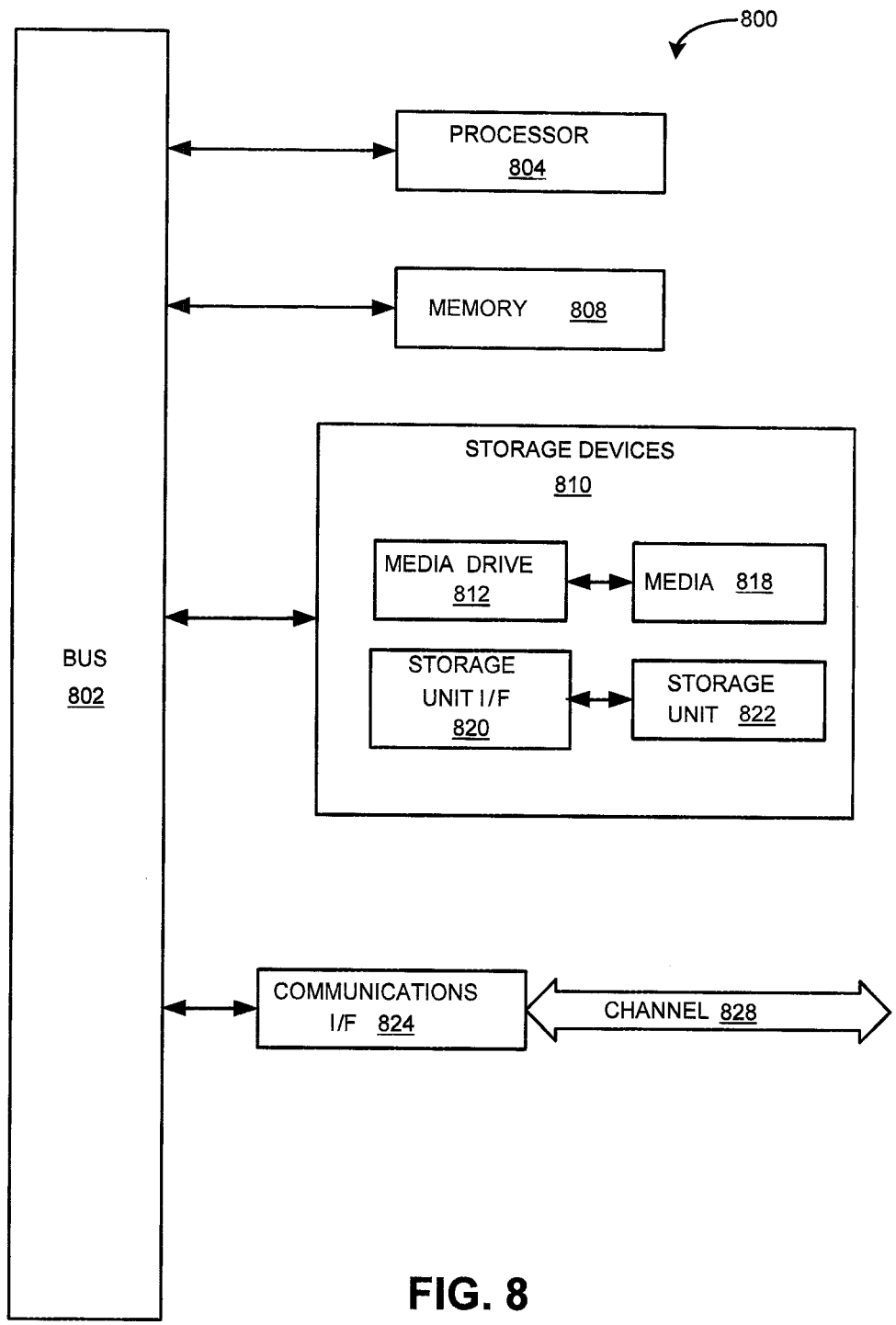
FIG. 8 illustrates a typical computing system that may be employed to implement some or all processing functionality in certain embodiments of the invention.

FIG. 8 illustrates a typical computing system 800 that may be employed to implement processing functionality in embodiments of the invention. Computing systems of this type may be used in clients and servers, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having stored therein particular computer software or data.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 808, storage media 818, or storage unit 822. These and other forms of computer-readable media may be involved in storing one or more instructions for use by processor 804, to cause the processor to perform specified operations. Such instructions, generally referred to as "computer program code" (which may be grouped in the form of computer programs or other groupings), when executed, enable the computing system 800 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage media 818, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

1. A method for routing callers to agents in a call-center routing environment, the method comprising the acts of:
   receiving or determining, by one or more computers, caller data associated with an incoming caller;
   determining or receiving, by the one or more computers, either a type or a degree or both the type and the degree, of the caller data associated with the caller, wherein a respective degree comprises a respective portion of a set of caller data types;
   selecting, by the one or more computers, an algorithm from at least two different algorithms for matching the caller to an agent, wherein at least one of the at least two different algorithms comprises an adaptive correlation algorithm trained on past caller data and/or agent data for agent-caller pairs matched according to the adaptive correlation algorithm, wherein the one or more computers select the algorithm based on either the type or the degree of the caller data associated with the caller that was determined or received, or based on both the type and the degree of the caller data associated with the caller that were determined or received; and causing, by the one or more computers, the caller to be routed based at least in part on results obtained from using the selected algorithm.

2. The method of claim 1, further comprising selecting the algorithm based on one or both of a degree and type of agent data associated with the agent.

3. The method of claim 1, wherein the caller is routed to an agent, a pool of callers, or a queue of callers.

4. The method of claim 1, wherein the agent is matched to one of a plurality of callers via the selected algorithm.

5. The method of claim 1, wherein at least two of the at least two different algorithms each comprise an adaptive correlation algorithm, and each of the adaptive correlation algorithms is trained using different degrees or types of caller data.

6. The method of claim 5, wherein at least two of the adaptive correlation algorithms are trained on past caller data and agent data for agent-caller pairs matched according to the adaptive correlation algorithm.

7. The method of claim 5, wherein at least one of the two adaptive correlation algorithms comprises a neural network algorithm.

8. The method of claim 1, wherein at least two of the at least two different algorithms each comprise an adaptive correlation algorithm, with the adaptive correlation algorithms being different from each other.

9. The method of claim 1, wherein one of the at least two algorithms comprises a performance based matching algorithm.

10. The method of claim 1, wherein at least one of the at least two algorithms does not comprise an adaptive correlation algorithm.

11. The method of claim 1, further comprising estimating an additional caller data based on the received or determined caller data.

12. The method of claim 1, wherein a first degree of caller data comprises no caller data and a second degree of caller data comprises a portion of a predefined set of caller data.

13. The method of claim 1, wherein the degree of caller data includes one or more of no caller data and Billing Telephone Number (BTN) data.

14. The method of claim 1, wherein a type of caller data includes one or more types of Billing Telephone Number (BTN) data.

15. A system for routing callers to agents in a call center routing environment, the system comprising one or more computers configured with logic to:

receive or determine, by the one or more computers, caller data associated with an incoming caller;

determine or receive, by the one or more computers, either a type or a degree or both the type and the degree, of the caller data associated with the caller, wherein a respective degree comprises a respective portion of a set of caller data types;

select, by the one or more computers, an algorithm from at least two different algorithms for matching the caller to an agent, wherein at least one of the at least two different algorithms comprises an adaptive correlation algorithm trained on past caller data and/or agent data for agent-caller pairs matched according to the adaptive correlation algorithm, wherein the one or more computers select the algorithm based on either the type or the degree of the caller data associated with the caller that was determined or received, or based on both the type and the degree of the caller data associated with the caller that were determined or received; and cause, by the one or more computers, the caller to be routed based at least in part on results obtained from using the selected algorithm.

16. The system of claim 15, further comprising logic configured to select the algorithm based on one or both of a degree and type of agent data associated with the agent.

17. The system of claim 15, wherein the caller is routed to an agent, a pool of callers, or a queue of callers.

18. The system of claim 15, wherein at least two of the at least two different algorithms each comprise an adaptive correlation algorithm, and each of the adaptive correlation algorithms is trained using different degrees or types of caller data.

19. The system of claim 18, wherein at least two of the adaptive correlation algorithms are trained on past caller data and agent data for agent-caller pairs matched according to the adaptive correlation algorithm.

20. The system of claim 18, wherein at least one of the two adaptive correlation algorithms comprises a neural network algorithm.

21. The system of claim 15, wherein at least two of the at least two different algorithms each comprise an adaptive correlation algorithm, with the adaptive correlation algorithms being different from each other.

22. The system of claim 15, wherein one of the at least two algorithms comprises a performance based matching.

23. The system of claim 15, wherein at least one of the at least two algorithms does not comprise an adaptive correlation algorithm.

24. The system of claim 15, further comprising logic configured to estimate an additional caller data based on the received or determined caller data.

25. The system of claim 15, wherein a first degree of caller data comprises no caller data and a second degree of caller data comprises a portion of a predefined set of caller data.

26. The system of claim 15, wherein the degree of caller data includes one or more of no caller data and Billing Telephone Number (BTN) data.

27. The system of claim 15, wherein the type of caller data includes one or more types of Billing Telephone Number (BTN) data.

28. A non-transitory computer readable storage medium comprising computer readable instructions for carrying out, when executed by one or more computers, the method of:

receiving or determining, by the one or more computers, caller data, associated with an incoming caller;

determining or receiving, by the one or more computers, either a type or a degree or both the type and the degree, of the caller data associated with the caller, wherein a respective degree comprises a respective portion of a set of caller data types;

selecting, by the one or more computers, an algorithm from at least two different algorithms for matching the caller to an agent, wherein at least one of the at least two different algorithms comprises an adaptive correlation algorithm trained on past caller data and/or agent data for agent-caller pairs matched according to the adaptive correlation algorithm, wherein the one or more computers select the algorithm based on either the type or the degree of the caller data associated with the caller that was determined or received, or based on both the type and the degree of the caller data associated with the caller that were determined or received; and causing, by the one or more computers, the caller to be routed based at least in part on results obtained from using the selected algorithm.

29. The computer readable storage medium of claim 28, further comprising program code for selecting the algorithm based on one or both of a degree and type of agent data associated with the agent.

30. The computer readable storage medium of claim 28, wherein the caller is routed to an agent, a pool of callers, or a queue of callers.

31. The computer readable storage medium of claim 28, wherein at least two of the at least two different algorithms each comprise an adaptive correlation algorithm, and each of the adaptive correlation algorithms is trained differently.

32. The computer readable storage medium of claim 31, wherein at least two of the adaptive correlation algorithms are trained on past caller data and agent data for agent-caller pairs matched according to the adaptive correlation algorithm.

33. The computer readable storage medium of claim 31, wherein at least one of the two adaptive correlation algorithms comprises a neural network algorithm.

34. The computer readable storage medium of claim 28, wherein at least two of the at least two different algorithms each comprise an adaptive correlation algorithm, with the adaptive correlation algorithms being different from each other.

35. The computer readable storage medium of claim 28, wherein one of the at least two algorithms comprises a performance based matching algorithm.

36. The computer readable storage medium of claim 28, wherein at least one of the at least two algorithms does not comprise an adaptive correlation algorithm.

37. The computer readable storage medium of claim 28, further comprising program code for estimating an additional caller data based on the received or determined caller data.

38. The computer readable storage medium of claim 28, wherein a first degree of caller data comprises no caller data and a second degree of caller data comprises a portion of a predefined set of caller data.

39. The computer readable storage medium of claim 28, wherein the degree of caller data includes one or more of no caller data and Billing Telephone Number (BTN) data.

40. The computer readable storage medium of claim 28, wherein the type of caller data includes one or more types of Billing Telephone Number (BTN) data.

\* \* \* \* \*